United States Patent
Dobryden et al.

(10) Patent No.: US 10,371,034 B2
(45) Date of Patent: Aug. 6, 2019

(54) COMBINATION EXHAUST GAS HEAT EXCHANGER/NOISE REDUCTION MEMBER

(71) Applicant: Ford Global Technologies, LLC, Dearborn, MI (US)

(72) Inventors: Allen Dennis Dobryden, Ann Arbor, MI (US); Daniel Neville, Essex (GB); Michael Reibling, Sterling Heights, MI (US); Keith A. Campbell, Canton, MI (US); Philip Warner, Essex (GB)

(73) Assignee: Ford Global Technologies, LLC, Dearborn, MI (US)

( * ) Notice: Subject to any disclaimer, the term of this patent is extended or adjusted under 35 U.S.C. 154(b) by 884 days.

(21) Appl. No.: 14/565,950

(22) Filed: Dec. 10, 2014

(65) Prior Publication Data

US 2016/0169075 A1    Jun. 16, 2016

(51) Int. Cl.
| F01N 5/02 | (2006.01) |
|---|---|
| F01N 1/16 | (2006.01) |
| B60H 1/00 | (2006.01) |
| B60H 1/20 | (2006.01) |

(52) U.S. Cl.
CPC ............ *F01N 5/02* (2013.01); *B60H 1/00328* (2013.01); *B60H 1/20* (2013.01); *F01N 1/166* (2013.01); *F01N 2230/00* (2013.01); *F01N 2240/02* (2013.01); *F01N 2590/11* (2013.01); *F01P 2060/00* (2013.01); *Y02T 10/16* (2013.01)

(58) Field of Classification Search
CPC .... F01N 5/02; F01N 2240/02; F01N 2410/00; F28F 2250/06; F28F 27/02; F28F 21/0003
See application file for complete search history.

(56) References Cited

U.S. PATENT DOCUMENTS

| 4,601,168 A | 7/1986 | Harris |
|---|---|---|
| 4,923,033 A | 5/1990 | Panick et al. |
| 7,281,606 B2 | 10/2007 | Marocco |
| 7,389,852 B2 | 6/2008 | Voss et al. |
| 8,838,310 B2 | 9/2014 | Tomatsuri |
| 2012/0024507 A1* | 2/2012 | Paze ................ F01N 1/166 165/138 |

FOREIGN PATENT DOCUMENTS

| DE | 1248373 | * | 8/1967 |
|---|---|---|---|
| DE | 102006060388 | * | 6/2008 |
| KR | 1020020046504 | * | 6/2002 |
| SU | 1543104 | * | 2/1990 |

OTHER PUBLICATIONS

Kofink, DE1248373TRANS (English Translation), Aug. 1967.*
Humburg, DE102006060388TRANS (Enlish Translation), Jun. 2008.*
Kuzmenko, SU1543104TRANS (English Translation), Feb. 1990.*
Hur, KR1020020046504TRANS (English Translation), Jun. 2002.*

* cited by examiner

*Primary Examiner* — Eric S Ruppert
(74) *Attorney, Agent, or Firm* — David B. Kelley; Brooks Kushman P.C.

(57) ABSTRACT

A combination exhaust gas heat exchanger and noise reduction unit is disclosed, whereby a heat exchanger and a noise reduction member are arranged side-by-side and integrated as a unit. A heat exchanger outlet opens directly into a chamber of the noise reduction member. In one arrangement, a bypass valve serves to selectively direct exhaust gas into either the heat exchanger or the noise reduction member, depending on an operating condition of an associated engine.

16 Claims, 3 Drawing Sheets

COMBINATION EXHAUST GAS HEAT EXCHANGER/NOISE REDUCTION MEMBER

TECHNICAL FIELD

The present disclosure relates generally to an exhaust gas heat recovery unit that includes a heat exchanger combined with a noise reduction member in a single unit.

BACKGROUND

Conventional heat exchangers include an exhaust pathway through which the exhaust gas passes, a coolant pathway through which coolant passes, and a bypass pathway that bypasses the exhaust gas according to an operating condition of the engine. When an engine operates at a low speed, the exhaust gas passes through the exhaust pathway. However, when the engine operates at a high speed, the exhaust gas passes through the bypass pathway, which is disposed closer to the coolant pathway than the exhaust pathway. The exhaust gas is cooled by the coolant when passing through the bypass pathway, by transferring the heat from the exhaust gas to the coolant.

However, the "heated coolant" may be used to warm-up an engine, or even the cabin of a vehicle. This is known as exhaust gas heat recovery. More specifically, in exhaust gas heat recovery, heat is removed from the exhaust gases of an engine and transferred elsewhere.

While faster engine warm-up to improve fuel economy and cabin warm-up (especially for hybrid vehicles) may be achieved by adding an exhaust gas heat recovery (EGHR) unit in an exhaust system, known EGHR units tend to be fairly large in size. However, because packaging space (especially in hybrid vehicles) is often at a premium, such EGHR units simply cannot be incorporated into certain vehicles.

Further, internal combustion engines often produce undesirable noise within a vehicle, especially when a high flow rate of exhaust gas is generated. Noise is particularly problematic in hybrid vehicles, as changes in ambient noise are noticeable because engines in hybrid vehicles repeatedly turn on and off.

To address such noise, it is known to utilize exhaust mufflers to reduce engine exhaust noise, as well as smooth exhaust-gas pulsations. The exhaust muffler is a separate device from the EGHR unit and may include a series of fixed expansion or resonance chambers of varying lengths, connected together by pipes. With this configuration, the exhaust noise reduction is achieved by the size and shape for the individual fixed expansion chambers. However, exhaust mufflers also take up valuable packaging room within the vehicle, further limiting design options for various components, such as EGHR units.

An EGHR unit that includes an integral noise attenuation device and minimizes packaging space requirements is needed.

SUMMARY

An exhaust gas heat exchanger and noise reduction unit is disclosed having a heat exchanger and a noise reduction member arranged side-by-side and integrated as a unit. A heat exchanger outlet opens directly into a chamber of the noise reduction member. Under certain operating conditions, exhaust gas is directed through the heat exchanger chamber and exits through the resonator.

One exemplary exhaust gas heat exchanger and noise reduction unit further comprises a wall member positioned between the noise reduction member chamber and a heat exchanger chamber to separate the heat exchanger and the noise reduction member within the unit. An inlet member extends from a first end of the noise reduction member and an outlet extends from the second end of the noise reduction member, wherein a first end of the inlet member is fluidly connected to the engine such that exhaust gas is configured to flow into the inlet member. The inlet member is fluidly connected to a primary inlet path member. The primary inlet path member is fluidly connected to the heat exchanger chamber. A bypass valve is arranged adjacent to a first end of the primary inlet path member, wherein the bypass valve is configured to selectively open or close the primary inlet path member according to an operating condition of the engine. When the primary inlet path member is closed, exhaust gas is directed through the inlet member and directly into the noise reduction member chamber.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
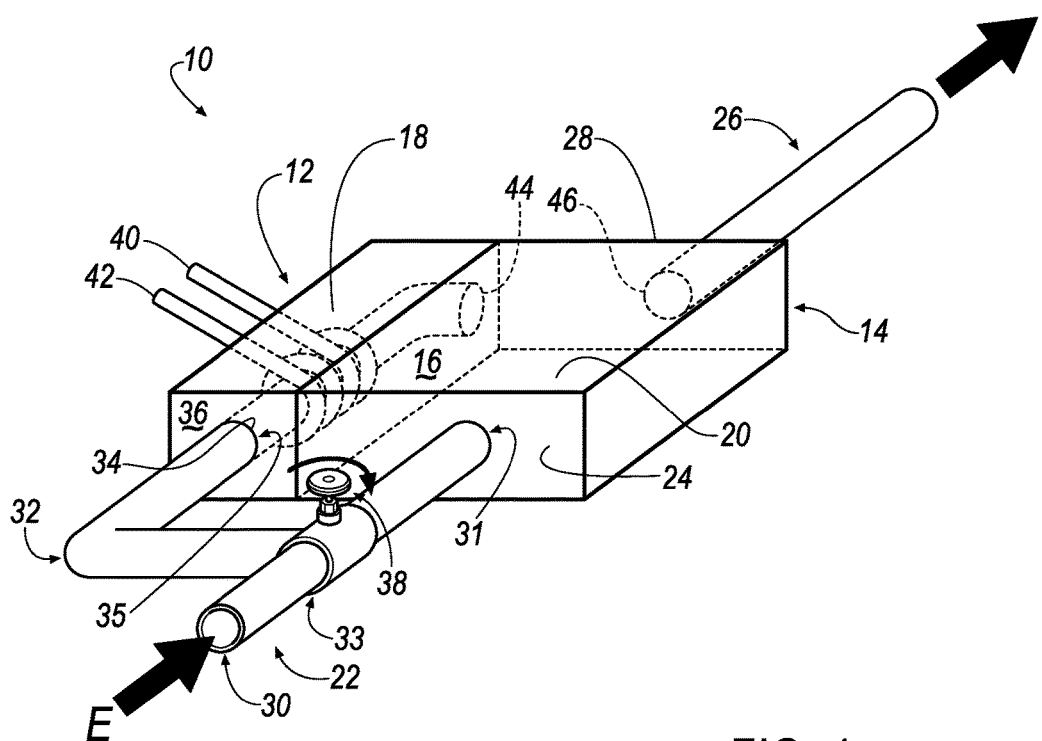
FIG. 1 is a schematic drawing of a combination exhaust gas heat exchanger and noise reduction unit.

Referring to FIG. 1, a combination exhaust gas heat exchanger and noise reduction unit 10 is illustrated. Unit 10 comprises an exhaust gas heat exchanger 12 that is integrated with a noise reduction member 14 into a single unit 10. The noise reduction member may be any suitable noise reduction member. For example, in one exemplary arrangement, the noise reduction member is configured as a resonator. Alternatively, the noise reduction member may be a muffler. For purposes of discussion below, the noise reduction member 14 will be described as a resonator, although the disclosure is not so limited.

In one exemplary configuration, the exhaust heat exchanger 12 and resonator 14 are arranged side-by-side such that the unit 10 may easily fit within most packaging constraints, including those associated with hybrid vehicles. Indeed, a side-by-side configuration allows for a reduced profile, as opposed to an arrangement where either the heat exchanger is arranged within a resonator unit or a resonator unit is arranged within a heat exchanger unit in a concentric arrangement, as such a configuration would have an increased profile, making the design prohibitive for certain packaging arrangements.

A wall member 16 is positioned between a heat exchanger chamber 18 and a resonator chamber 20 so as to separate the heat exchanger 12 and the resonator 14 within the unit 10. The resonator 14 may be of any suitable configuration. In one exemplary arrangement, the resonator has a perforated clamshell configuration.

An inlet member 22 extends from a first end 24 of the resonator 14. An outlet member 26 extends from a second end 28 of the resonator 14. A first end 30 of the inlet member 22 is fluidly connected to the engine such that exhaust E is configured to flow from the engine and into the inlet member 22. A second end 31 of the inlet member 22 is connected to the resonator 14.

The inlet member 22 is also fluidly connected to a primary inlet path member 32. In one exemplary arrangement, the primary inlet path member 32 includes a first end 33 that intersects and opens into the inlet member 22. A second end 35 of the primary inlet path member 32 extends through an opening 34 formed through an exterior wall 36 of the heat exchanger 12. In one exemplary arrangement, the exterior wall 36 is contiguous with the first end 24 of the resonator 14. In one exemplary arrangement, the primary inlet path member 32 may be configured with a right angle to produce a reduced/compact profile. However, it is understood that other configurations of the primary inlet path member 32 are also contemplated. For example, the primary inlet path member 32 may be configured to extend linearly between the inlet member 22 and the exterior wall 36 such that the primary inlet path member 32 intersects the exterior wall 36 of the heat exchanger 12 at an angle.

A bypass valve 38 is arranged in the inlet member 22, adjacent to the first end 33 of the primary inlet path member 32. The bypass valve 38 is configured to selectively open or close the primary inlet path member 32 according to an operating condition of an engine. In one exemplary configuration, the bypass valve 38 is electrically operated. That is, the valve 38 is electrically connected to a control system 50, shown in FIG. 2, and may be operated by an output signal of the control system according to an operating condition of the engine, as will be explained in further detail below.

Figure 2:
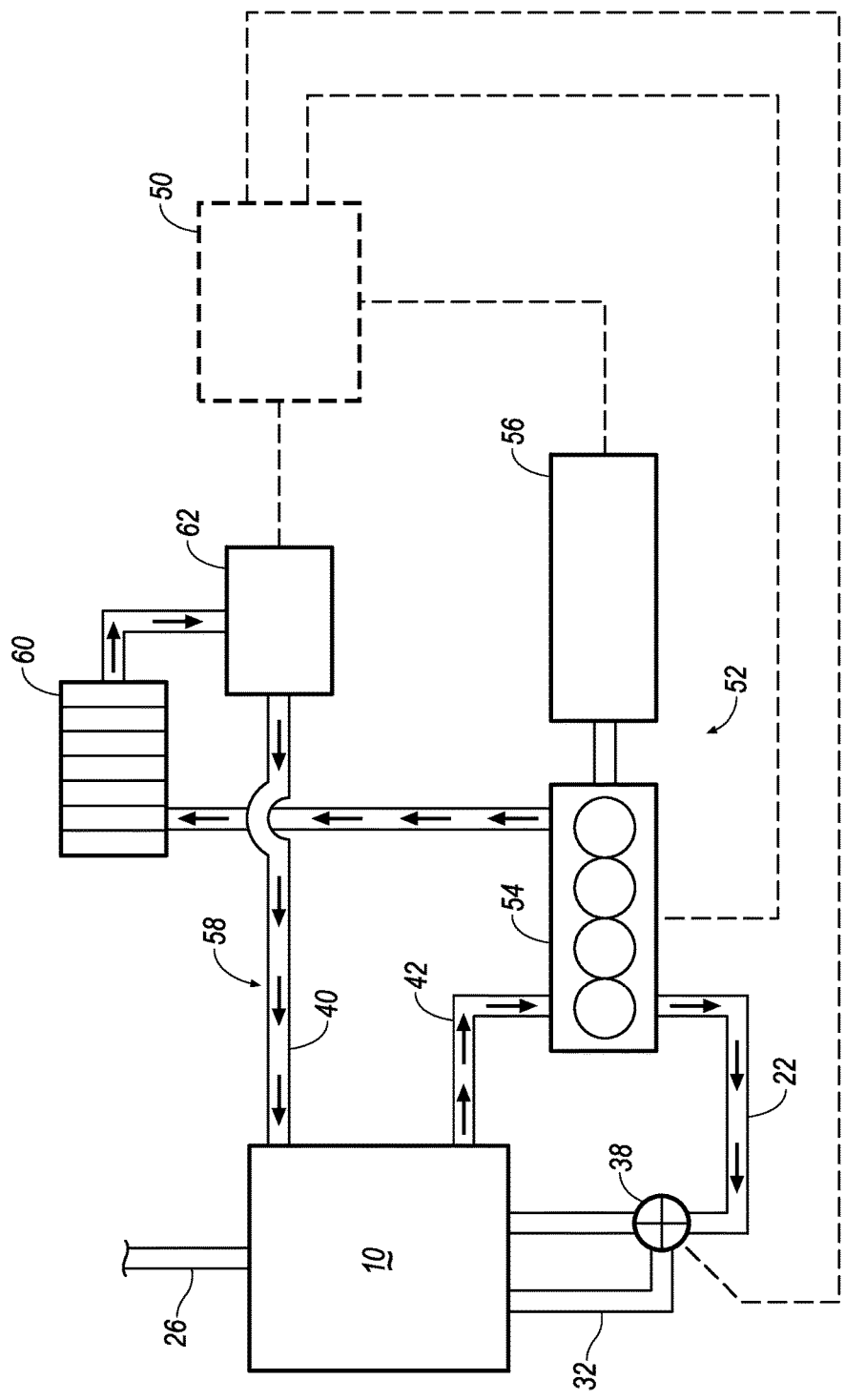
FIG. 2 is a schematic drawing of an exemplary vehicle powertrain having an exhaust gas heat recovery system in communication with an engine.

Referring to FIG. 2, a schematic diagram of selected components of a vehicle incorporating the unit 10 is shown. Physical placement and orientation of the components within the vehicle may vary. The vehicle includes a powertrain 52. The powertrain 52 includes an engine 54 that is drivingly connected to a transmission 56, which may which may be a hybrid transmission having one or more electric machines (not separately shown). Alternatively, the vehicle may include one or more electric machines acting directly on the engine output or the transmission input. The engine 54 releases exhaust gas through an exhaust system, which includes unit 10, as explained herein.

The control system 50 may be used to operate various components of the engine 54, transmission 56, and unit 10. The control system 50 may include one or more components (not separately shown) with a storage medium and a suitable amount of programmable memory, which are capable of storing and executing one or more algorithms or methods to effect control of the exhaust system for the powertrain 52. Each component of the control system 50 may include distributed controller architecture, such as a microprocessor-based electronic control unit (ECU). Additional modules or processors may be present within the control system 50.

A coolant circuit 58 moves coolant or water from the engine 54 through the unit 10, such that the coolant circuit 58 and the unit 10 are in heat-exchange communication. The coolant circuit 58 may be pressurized by a pump (not shown) incorporated with the engine 54. The coolant circuit 58 comprises coolant tube inlet 40 and coolant tube outlet 42 and provides heat-exchange communication between the engine 54 and the unit 10.

Exhaust gas exits engine 54 into an inlet member 22 of the unit 10. Bypass valve 38 controls flow of exhaust gases through the unit 10. As explained above, in its non-bypass position, the flow of exhaust gases is directed through the heat exchanger 12 portion of the unit 10. In this configuration, exhaust gases allows heat-exchange communication between the exhaust gases and the coolant flowing through the coolant circuit 58. In contrast, when the bypass valve 38 is actuated to a bypass configuration, the primary inlet path member 32 is closed and exhaust gas is instead directed through the noise reduction member 14, and out through outlet member 26.

Heated coolant exiting the unit 10 may be directed back to the engine 54 to allow for engine warmup and/or may be directed to a radiator 60 to allow for cabin warm up. An auxiliary pump 62 may be used as the main pressure source for the coolant circuit 58, or as a supplement to a pump incorporated into the engine 54 (not shown).

The control system 50 is operatively connected to the bypass valve 38. The control system 50 communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 2, control system 50 may communicate signals to and/or from engine 14, transmission 56, auxiliary pump 62, and/or unit 10. Control logic or functions performed by control system 50 with respect to unit 10 is represented by the flow chart in FIG. 3.

Figure 3:
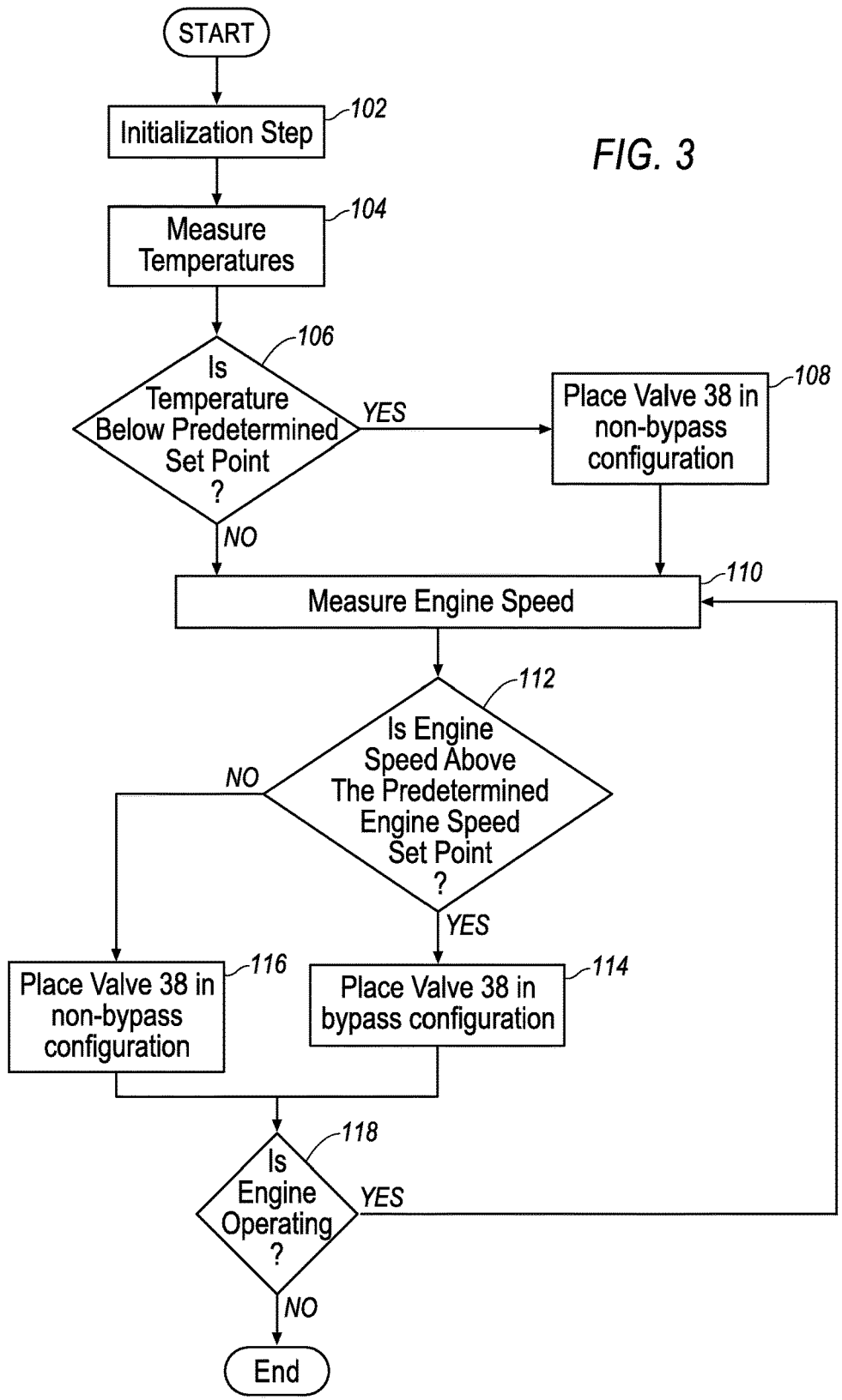
FIG. 3 is a schematic flow chart diagram of a method of controlling the exhaust gas heat recovery system.

More specifically, a method 100 for controlling exhaust gas heat recovery and distribution in vehicles incorporating unit 10 is illustrated in FIG. 3. The method 100 may begin at an initialization step 102, where the method 100 is monitoring operating conditions of the vehicle. The initiation step 102 may be triggered by a number of different conditions, such as a vehicle operator inserting an ignition key.

In step 104, various temperatures may be determined, including temperatures of selected vehicle components. For example, ambient air temperature may be monitored with an appropriate ambient air sensor and engine water temperature may also be monitored with an appropriate engine water sensor. With this temperature data, the control system 50 may be configured to compare the monitored temperature readings and compare those readings with one or more predetermined cold temperature set points. At step 106, the method 100 determines whether the sensed temperature is below the predetermined set point. If the temperature is below the predetermined set point, the method proceeds to step 108.

At step 108, the control system 100 actuates the bypass valve 38 into the non-bypass configuration. For example, if an engine water temperature reading may determine that an engine warmup need exists, the control system 50 may actuate the bypass valve 38 to be in the non-bypass configuration such that heated exhaust may be used to heat the coolant directed through the coolant circuit 58 to warm up the engine 54. As another example, if the ambient air temperature reading is below the predetermined cold temperature set point, the control system 50 may actuate the bypass valve 38 to the non-bypass configuration such that heated exhaust may be used to heat the coolant in the coolant circuit and the heated coolant may be directed to the radiator 60 to heat the cabin. Once the bypass valve 38 is actuated into the non-bypass configuration, the method 100 proceeds to step 110.

If the temperature is at or above the predetermined cold temperature set point, the method 100 proceeds to step 110. At step 110, the control system 50 measures the engine speed. The method 100 then progresses to step 112.

At step 112, the method 100 determines whether the measured engine speed is above a predetermined engine speed set point. If the engine speed is above the predetermined set point, the method proceeds to step 114.

At step 114, if the engine is operated at a speed above a predetermined set point where the engine is generating a high exhaust flow, the control system will actuate the bypass valve 38 to place the bypass valve 38 in the bypass configuration. In this position, the bypass valve 38 serves to close off the primary inlet path member 32 such that exhaust gas will be directed through the inlet member 22 and into the resonator chamber 20 of the noise reduction member 14. In this manner, undesirable noise generated from the high exhaust flow will be reduced by the noise reduction member 14. The method 100 will then return to step 110 to continue to monitor engine speed.

If the measured engine speed is at or below the predetermined engine speed set point, the method proceeds to step 116. At step 116, if the bypass valve 38 was previously in the by-pass configuration, the control system will actuate the bypass valve 38 to place the bypass valve 38 in the non-bypass configuration. As discussed above, in the non-bypass configuration, the bypass valve will open and exhaust from the engine E entering into the inlet member 22 will be diverted into the primary inlet path member 32, and into the heat exchanger 12. In this manner, the coolant within the coolant circuit 58 may be heated by the exhaust passing through the heat exchanger 12.

At step 118, the method then determines whether the engine 54 is still operating. If the engine is still operating, the method 100 then returns back to step 110. The method 100 will continue until the engine is turned off upon which the method will start again with step 102.

In one contemplated arrangement, exhaust is introduced into the primary inlet path member 32 under normal operation, i.e., at a low exhaust gas flow rate, such that exhaust flows into the heat exchanger chamber 18. Coolant is introduced into a coolant tube inlet 40. The coolant tube inlet 40 extends into the heat exchanger chamber 18, where it is heated by the exhaust gas directed through the primary inlet path member 32. Heated coolant then exits through a coolant tube outlet 42 and may be redirected back to the engine. Any suitable configuration of the coolant tube 40/42 may be utilized. In one exemplary arrangement, coolant tube inlet and outlet 40/42 may be a generally U-shaped tube, with the exhaust gas passing between the tube inlet 40 and tube outlet 42 portions. In another exemplary arrangement, the coolant tube may be coiled around the exhaust tube disposed within the heat exchanger chamber 18. The heated coolant may be utilized for warming up the engine when the temperature of the engine is low, such as during a cold day or after being powered off for an extended time. The heated coolant may also be utilized to warm up a vehicle cabin.

The exhaust gas will pass through the heat exchanger chamber 18 and be directed to a heat exchanger outlet 44. The heat exchanger outlet 44 opens into the resonator chamber 14 such that cooled exhaust gas is directed into the resonator 14.

Once exhaust gas is in the resonator 14, whether directed from the heat exchanger outlet 44 or directly from the inlet member 22, the resonator 14 is used to reduce noise generated by the flow of the exhaust gas to or below a predetermined noise level. The exhaust gas will then exit the resonator 14 through a resonator outlet 46. The resonator outlet 46 is fluidly connected to the outlet member 26, where the exhaust gas is expelled from the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An exhaust gas heat exchanger, comprising:
   a noise reduction member arranged side-by-side and integrated with the heat exchanger as a single unit, a common wall member partially defining the noise reduction member and the heat exchanger, wherein a heat exchanger outlet opens directly into a chamber of the noise reduction member.

2. The exhaust gas heat exchanger of claim 1, wherein the common wall member is positioned between the chamber of the noise reduction member and a heat exchanger chamber to separate the heat exchanger and the noise reduction member within the unit.

3. The exhaust gas heat exchanger of claim 1, further comprising an inlet member that extends from a first end of the noise reduction member and an outlet that extends from a second end of the noise reduction member, wherein a first end of the inlet member is fluidly connected to an engine such that exhaust gas is configured to flow into the inlet member.

4. The exhaust gas heat exchanger of claim 3, wherein the inlet member is fluidly connected to a primary inlet path member, and wherein the primary inlet path member is fluidly connected to a heat exchanger chamber.

5. The exhaust gas heat exchanger of claim 4, wherein the primary inlet path member includes a first end that intersects and opens into the inlet member.

6. The exhaust gas heat exchanger of claim 4, wherein the primary inlet path member is configured with a right angle with respect to the inlet member.

7. The exhaust gas heat exchanger of claim 4, further comprising a bypass valve arranged adjacent to the first end of the primary inlet path member, wherein the bypass valve is configured to selectively open or close the primary inlet path member according to an operating condition of an associated engine.

8. The exhaust gas heat exchanger of claim 7, wherein the bypass valve is operatively connected to a control system and wherein the control system outputs a signal to actuate the bypass valve to close off the primary inlet path member according to a predetermined operating condition of the engine.

9. The exhaust gas heat exchanger of claim 3, further comprising at least one coolant tube, each coolant tube comprising an inlet and an outlet, wherein a portion of each coolant tube is disposed within the heat exchanger chamber such that coolant is directed through the inlet of each coolant tube and into the heat exchanger chamber, heated by the exhaust gas, and directed through the outlet of each coolant tube.

10. The exhaust gas heat exchanger of claim 9, wherein the coolant tube has a generally U-shape.

11. The exhaust gas heat exchanger of claim 9, wherein the coolant tube is configured as a coil.

12. The exhaust gas heat exchanger of claim 1, wherein the noise reduction member is a resonator.

13. An exhaust gas heat exchanger and resonator unit, comprising:
    a heat exchanger and a resonator arranged side-by-side and integrated as a unit, wherein a heat exchanger outlet opens directly into a resonator chamber of the resonator;
    a common wall member positioned between and partially defining the resonator chamber and a heat exchanger chamber to separate the heat exchanger and the resonator within the unit;
    an inlet member that extends from a first end of the resonator and an outlet that extends from a second end of the resonator, wherein a first end of the inlet member is configured for fluidly connecting to an engine such that exhaust gas is configured to flow into the inlet member; wherein the inlet member is fluidly connected to a primary inlet path member, and wherein the primary inlet path member is fluidly connected to the heat exchanger chamber; and
    a bypass valve arranged adjacent to a first end of the primary inlet path member, wherein the bypass valve is configured to selectively open or close the primary inlet path member according to an operating condition of the engine; wherein when the primary inlet path member is closed, exhaust gas is directed through the inlet member and directly into the resonator chamber.

14. The exhaust gas heat exchanger and resonator unit of claim 13, wherein the bypass valve is operatively connected to a control system and wherein the control system outputs a signal to actuate the bypass valve to close off the primary inlet path member according to a predetermined operating condition of the engine.

15. The exhaust gas heat exchanger and resonator unit of claim 14, further comprising at least one coolant tube having an inlet and an outlet, wherein a portion of the coolant tube is disposed within the heat exchanger chamber such that coolant is directed through the inlet of the coolant tube and into the heat exchanger chamber, heated by the exhaust gas, and directed through the outlet of the coolant tube.

16. An exhaust gas heat exchanger and noise reduction member unit, comprising:
    a heat exchanger and a noise reduction member arranged side-by-side and integrated as a unit, wherein a heat exchanger outlet opens directly into a chamber of the noise reduction member;
    a common wall member positioned between and partially defining the chamber of the noise reduction member and a heat exchanger chamber to separate the heat exchanger and the noise reduction member within the unit;
    an inlet member that extends from a first end of the noise reduction member and an outlet that extends from a second end of the noise reduction member, wherein a first end of the inlet member is fluidly connected to an engine such that exhaust gas is configured to flow into the inlet member;
    wherein the inlet member is fluidly connected to a primary inlet path member, and wherein the primary inlet path member is fluidly connected to the heat exchanger chamber;
    a bypass valve arranged adjacent to a first end of the primary inlet path member, wherein the bypass valve is configured to selectively open or close the primary inlet path member according to an operating condition of the engine; wherein when the primary inlet path member is closed, exhaust gas is directed through the inlet member and directly into the chamber of the noise reduction member; and
    at least one coolant tube having an inlet and an outlet, wherein a portion of the coolant tube is disposed within the heat exchanger chamber such that coolant is directed through the inlet of the coolant tube and into the heat exchanger chamber, heated by the exhaust gas passing through the heat exchanger, and then directed through the outlet of the coolant tube.

* * * * *